United States Patent [19]

Davis et al.

[11] Patent Number: 5,571,232
[45] Date of Patent: Nov. 5, 1996

[54] THERMAL ENERGY STORAGE TANK CONTAINING SUBMERGED ICE MASS

[75] Inventors: Thomas L. Davis, Raleigh; Alexander O. Hobbs, Cary; Barney P. Roberts, Jr., Wake Forest, all of N.C.

[73] Assignee: Carolina Power & Light Company, Raleigh, N.C.

[21] Appl. No.: 459,776

[22] Filed: Jun. 2, 1995

[51] Int. Cl.⁶ .................................................. F25D 3/00
[52] U.S. Cl. .................................................. 62/59; 62/330
[58] Field of Search .............................. 62/59, 330, 332, 62/435

[56] References Cited

U.S. PATENT DOCUMENTS

| | | | |
|---|---|---|---|
| 2,160,389 | 5/1939 | Palmer | 62/59 |
| 2,538,015 | 1/1951 | Kleist | 62/59 X |
| 2,737,027 | 3/1956 | Kleist | 62/59 X |
| 4,509,344 | 4/1985 | Ludwigsen et al. | 62/330 X |
| 4,753,080 | 6/1988 | Jones et al. | 62/59 |
| 5,063,748 | 11/1991 | Davis et al. | 62/59 |
| 5,065,598 | 11/1991 | Kurisu et al. | 62/330 |
| 5,195,850 | 3/1993 | Davis et al. | 406/92 |
| 5,390,501 | 2/1995 | Davis et al. | 62/59 |

*Primary Examiner*—William E. Tapolcai
*Attorney, Agent, or Firm*—Richard S. Faust

[57] ABSTRACT

A flooded thermal energy storage tank holds an agglomerated ice mass that is fully submerged in water by a counterbuoyant top. The thermal energy stored in the tank is used to satisfy a cyclical thermal cooling load that is uncoupled from the power supply that produces the ice for the tank. A water supply loop for supplying cold water to the thermal load assures that the relatively colder water in the tank is supplied by withdrawing the water from an upper location within the ice mass. The supply loop also assures that water returned from the load to the tank is recooled by the ice mass in a thermodynamically efficient manner. The essential symmetry of the ice mass is retained during repetitive ice mass melting and rebuilding in an operational cycle to assure continual stability of the ice mass and tank top.

20 Claims, 5 Drawing Sheets

THERMAL ENERGY STORAGE TANK CONTAINING SUBMERGED ICE MASS

FIELD OF INVENTION

The present invention relates to thermal energy storage. More particularly, the invention relates to a thermal energy storage tank of the type that holds an ice mass submerged in water, and the flow regimes for withdrawing cold water from the tank for use in cooling a thermal load and reintroducing the water into the tank at an elevated temperature for recooling.

BACKGROUND OF THE INVENTION

Recent developments in thermal energy storage have focused on storing thermal energy in the form of a submerged ice mass in a water-flooded, insulated storage tank. As shown in U.S. Pat. No. 5,063,748, the ice mass may be formed by introducing ice particles at the bottom of the flooded tank to form an ice mass having the shape of an inverted cone. The tank includes a top structure for applying a counterbuoyant force to the ice mass to maintain the ice mass in a submerged state. The ice mass may be built continuously, or during off-peak electricity demand hours (usually, nights and weekends), by producing and delivering ice particles from a conventional ice plant adjacent to the tank. During those times when the thermal energy is needed to cool a load, usually during peak electricity demand hours, cold water is pumped from the tank to the load and thereafter returned to the tank at an elevated temperature, thereby melting ice and reducing the ice charge in the tank. Further details of such a thermal energy storage system are contained in U.S. Pat. No. 5,390,501 which describes a system for delivering ice from the ice plant to the thermal storage tank and U.S. Pat. No. 5,195,850 which describes a system for delivering the ice particles, against the buoyant force of the water in the tank, to the bottom of the tank.

In the operation of thermal energy storage tank systems as described above, it is important to maximize the thermodynamic efficiency of the system. One aspect of efficiency is the capability of consistently withdrawing the relatively colder water in the tank for delivery to the load. Various temperature gradients and eddy currents within the tank make consistent withdrawal of the coldest water a difficult task. Another issue is the desirability of maintaining the symmetry of the ice mass at all times, including times when the tank is almost fully charged with ice (e.g. a 95–100% ice charge) and times when most of the ice has been melted (e.g. a 5–10% ice charge). Symmetry of the ice mass results in more predictable operation of the system. More importantly, symmetry of the ice mass is critical for maintaining the stability of the ice mass and its associated counterbuoyant floating top. Stated differently, a significant loss of symmetry in the ice mass during numerous cycles of melting down the ice mass and subsequent rebuilding thereof can result in a loss of equilibrium and a roll over by the ice mass.

Thus, in the design and operation of thermal energy storage tank systems of the above-mentioned variety, there is a need for improved supply and return water loops and ice handling systems to enhance the thermodynamic efficiency of the system. Also there is a need to achieve the safety and operational advantages associated with retaining the essential symmetry of the ice mass during repetitive ice mass melting and rebuilding in an operational cycle.

SUMMARY OF THE INVENTION

The present invention provides a novel method and apparatus for meeting the several needs cited immediately above.

In one aspect, the present invention may be defined as a method for use in the operation of a thermal energy storage tank system of the type wherein thermal energy is stored as an ice mass submerged in water in a tank. The method is designed to withdraw relatively colder water from the storage tank for use at a cooling load and to assure that water returned from the load to the tank is recooled by the ice mass in a thermodynamically efficient manner. The method comprises the steps of withdrawing relatively colder water from the storage tank at least one upper location in the tank within the ice mass, delivering the relatively colder water to the load and returning water from the load to the tank external of the ice mass for recooling by the ice mass. According to a preferred manner of practicing the invention, the steps of withdrawing water from the tank and introducing water back into the tank are accomplished at locations that are symmetrically disposed with respect to the ice mass to produce a symmetrical melt of the ice mass during repetitive ice mass melting and rebuilding. In preferred embodiments, the ice mass is formed in the shape of an inverted cone and the relatively colder water is withdrawn from a central upper location within the ice mass, while water is returned to the tank for recooling uniformly around the perimeter of the tank near the water level in the tank.

In another aspect, the present invention may be described as a thermal energy production, storage and reclaim system utilized to satisfy a cyclical thermal cooling load that is uncoupled from the power supply that produces the thermal energy. The system includes a thermal energy storage tank that is maintained in a flooded state, means for introducing ice particles from an ice plant into the tank to form a floating ice mass and a top for exerting a counterbuoyant force on the ice mass to maintain the ice mass in a submerged state. A suction port arrangement is located relatively closely under the top and within the ice mass for withdrawing relatively colder water from the tank for use at a thermal load. Means are provided for delivering the water to the thermal load and returning water from the load to the tank external of the ice mass. In preferred embodiments, the water is returned from the load to be recooled by uniformly injecting the water around the perimeter of the tank near the water level in the tank.

BRIEF DESCRIPTION OF THE DRAWINGS

Some of the objects having been stated, other objects will appear as the description proceeds, when taken in connection with the accompanying drawings, in which.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
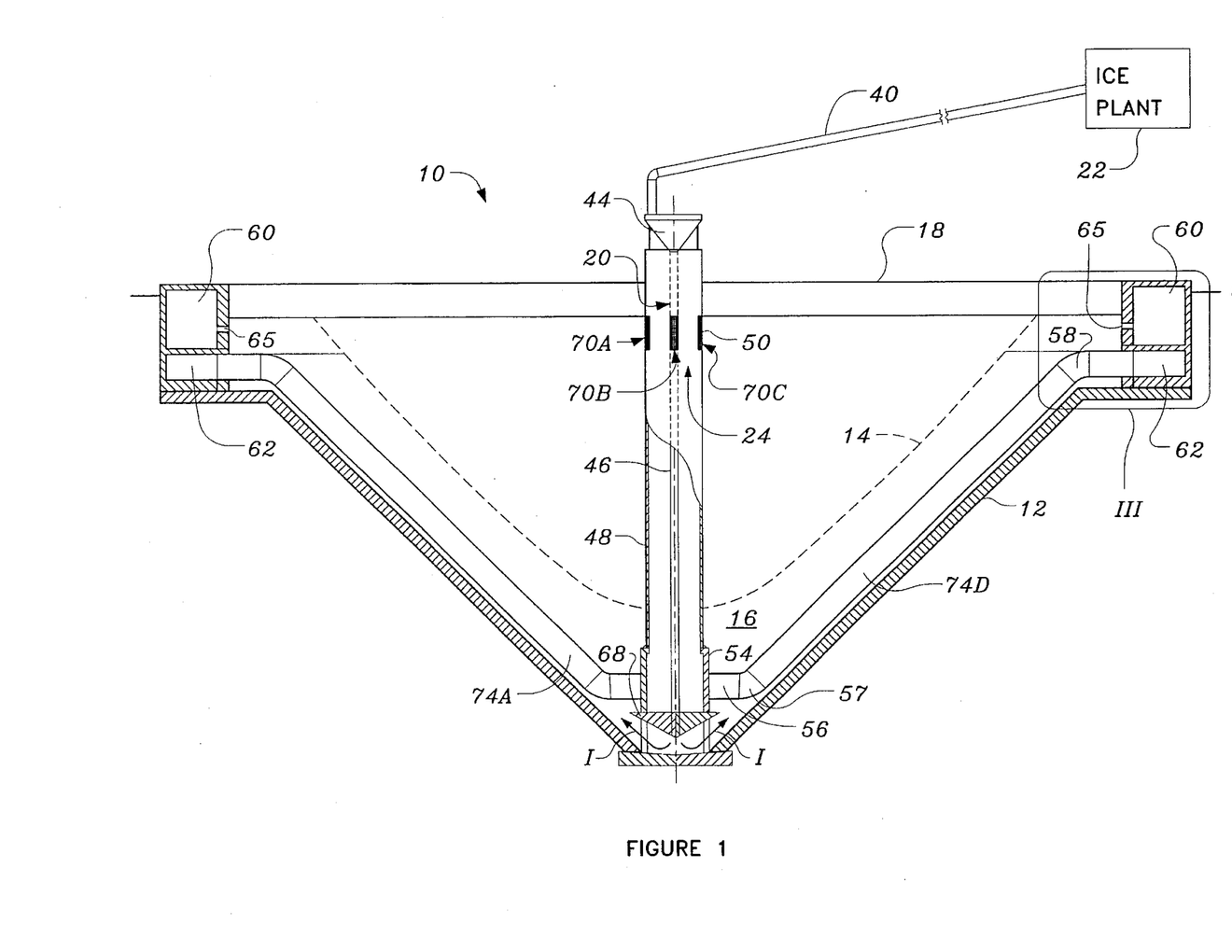
FIG. 1 is a side view, mostly in section, of a thermal energy storage tank system designed and operated in accordance with the principles of the present invention.
Figure 2:
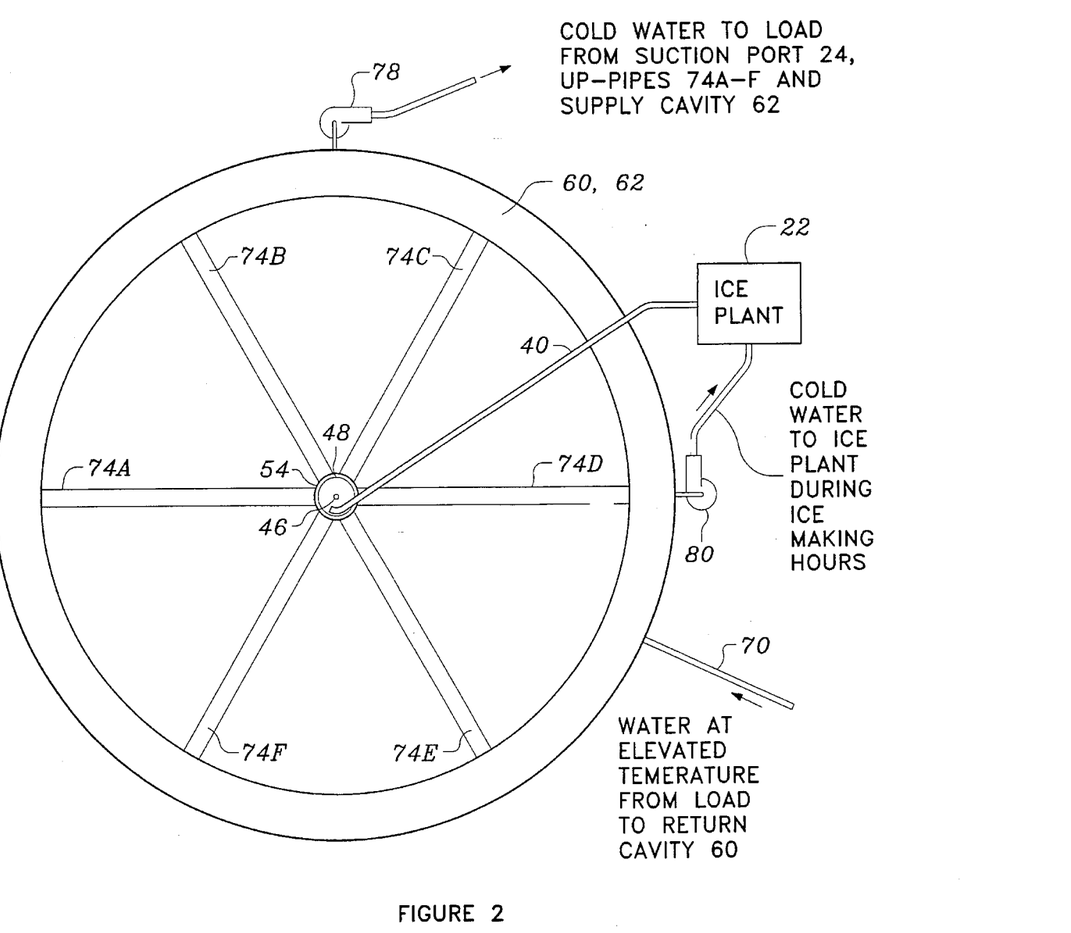
FIG. 2 is a partly schematic top view of tube thermal energy storage tank system shown in FIG. 1 with the top structure and ice introduction hopper removed to facilitate illustration.

Referring to the drawings, and particularly to FIGS. 1 and 2, there is shown a thermal energy production, storage and reclaim system including a thermal energy storage tank system 10 constructed in accordance with the principles of the present invention. Tank system 10 includes an earth-excavated, flooded thermal energy storage tank 12 containing an agglomerated ice mass 14 immersed in water 16, a tank top 18, means (not shown) for maintaining a flooded state in the tank, a vortex downpipe system 20 for introducing ice produced at ice plant 22 into the tank, a suction port arrangement 24 at which cold water is withdrawn from the tank, a circumferential supply water cavity 62 that receives the cold water from the suction port arrangement and from which the cold water is pumped to the cooling load, and a circumferential return water cavity 60 for use in uniformly and symmetrically returning water from the load at an elevated temperature to the tank external of the ice mass. A general description of the structure and operation of thermal energy storage tank system 10 will follow, with the understanding that many details of the tank structure and operation are contained in U.S. Pat. No. 5,063,748, incorporated herein by reference. Furthermore, details of the delivery of ice from the ice machine to the vortex downpipe system 20 are found in U.S. Pat. No. 5,390,501, incorporated herein by reference.

Tank 12 has an inwardly sloping sidewall structure inclined at an angle in the range from about 30° to 70°. Preferably, tank 12 is formed in the shape of a truncated cone having side walls sloping at an angle on the order of 45°. Other suitable shapes are an inverted truncated frustum and an inverted truncated obelisk. Ice mass 14 is formed in tank 12 by the introduction of ice particles at the bottom of vortex downpipe system 20, with the ice particles floating up in the water and against top 18 to form an inverted conical ice mass having a negative angle of repose. In the embodiment of FIG. 1, the inclination of the walls of tank 12 is chosen to approximately match the angle of repose so that as the ice mass is built to a point where it occupies a large percentage of the tank, there is little unused space. Preferably, top 18 is a floating top having a weight that exceeds the buoyant force of a full charge of ice in tank 12 so that the top can exert sufficient counterbuoyant force to maintain a full charge of ice in a submerged state. A top with somewhat less weight will, nevertheless, maintain the ice mass submerged to a greater extent that if the ice mass were free floating. At a full ice charge, the top floats substantially above water level. At lower ice charges, a substantial portion of the top becomes submerged as well As used herein, "full ice charge" or "100% ice charge" refers to the situation where the full ice-holding capacity of the tank has been reached. It will be appreciated, however, that even at full ice charge, the tank contains a substantial amount of water due to the volume of water that occupies the space between the stored ice particles in the agglomerated ice mass, as well as water that occupies the dead space between the outer boundary of the ice mass and the walls of the tank. In applications utilizing a tank shaped as shown in FIGS. 1 and 2, and with ice particles having a hollow cylindrical configuration, full ice charge may represent approximately 60% ice and 40% water by volume. Likewise, a 70% ice charge as shown in FIG. 1, represents approximately 42% ice (0.6×0.7) and 58% water. While higher volumetric percentages of ice may be achieved at full ice charge by using solid ice pieces, it has been found advantageous to use hollow ice particles to facilitate flow of water through the ice mass, thereby enhancing heat transfer.

Top 18 may take any convenient form, such as a top formed of lightweight concrete blocks as described in U.S. Pat. No. 5,063,748. Alternatively, the top may be formed from thermoplastic materials having a suitable density to provide the ice submersing function described above. When the top is formed of discrete floating elements, it is often desirable to provide a bladder membrane above the floating elements.

As shown in FIGS. 1 and 2, the vortex downpipe system 20 receives ice particles from ice machine 22 via pipe 40. The ice particles and associated transport water are introduced tangentially into a hopper 44 above top 18 and are conveyed in a vortex swirl in pipe 46 to an ice injection port at the bottom of tank 12 where the ice particles are discharged at arrows I and float upwardly to form ice mass 14, all as described in detail in U.S. Pat. No. 5,195,859. In one embodiment, pipe 46 takes the form of an 8-inch OD PVC pipe and is encased in a 60-inch diameter concrete pipe 48, e.g. a pipe of the type used to form culverts. Pipe 48 serves to define a columnar structure located at the vertical centerline of tank 12.

As stated above, the purpose of the above-described structure is to provide thermal energy on demand to a load, usually at very high energy usage rates. Thus, when cold water is pumped on demand from tank 12 to a load, the melting of ice is relatively rapid. In contrast, the building or rebuilding of the ice mass may take place at a slower rate. As an example, for a thermal load that occurs only during an electric utility's peak demand hours, e.g. 12 noon–4 p.m. on weekday summer afternoons, system 10 may be operated so that by 12 noon on Monday the ice charge approaches 100% (after uninterrupted ice buildup over the weekend). Thus, at 12 noon on Monday ice is melted to provide cooling at a relatively high rate to a load for four hours, reducing the ice charge to 60%. The ice mass is then rebuilt until noon Tuesday, recharging the ice mass to 88%. A representative full week cycle is shown in Table I.

TABLE I

| DAY OF WEEK | Ice Charge 12:00 NOON | Ice Charge 4:00 p.m. |
|---|---|---|
| Monday | 100% | 60% |
| Tuesday | 88% | 48% |
| Wednesday | 76% | 36% |

TABLE I-continued

| DAY OF WEEK | Ice Charge 12:00 NOON | Ice Charge 4:00 p.m. |
| --- | --- | --- |
| Thursday | 64% | 24% |
| Friday | 52% | 12% |
| Saturday | 39% | 44% |
| Sunday | 71% | 76% |

The present invention is directed to withdrawing the relatively colder water from tank 12 for use at the thermal load and to assure that water returned from the load to the tank is recooled by the ice mass in a thermodynamically efficient manner. The invention is also concerned with maintaining the symmetry of the ice mass during repetitive ice mass melting and rebuilding in an operational cycle to assure continuing stability of the ice mass and tank top.

The water supply and water return systems of one preferred embodiment of the invention will now be described with primary reference to FIGS. 1–3. A pair of circumferential water cavities is formed at the top perimeter of top 12 to facilitate water supply and return. Circumferential return water cavity 60 is positioned mostly below grade "G" as shown in FIG. 1. Circumferential supply water cavity 62 underlies cavity 60.

The purpose of the water supply loop is to (i) provide relatively colder water to the load as needed and (ii) return the transport and sluice water that flows with the ice particles through downpipe 46 back to the ice machine during ice making hours. The water to the supply loop is taken from the tank along the vertical centerline of the ice mass, preferably at a central, upper location in the tank, most preferably just under the top. In the illustrated embodiment, cold water withdrawal is achieved by utilizing a suction port arrangement 24 in pipe 48 near the top of the tank, put far enough below top 18 so that full flow can be obtained with the top at its lowest position when the ice charge is approaching zero. The suction port arrangement permits adjacent relatively colder water to be sucked through the port and down the annular passage between pipe 48 and downpipe 46 to six up-pipes 74A–F that connect the bottom of pipe 48 to circumferential supply cavity 62. A pair of pumps communicates with supply cavity 62 to pump the supply water to one of the destinations. A first pump 78 pumps water to the load when needed. A second, smaller pump 80 pumps water back to the ice machine during ice making hours.

Referring to the water supply loop in more detail, the suction port arrangement 24 at the central top portion of the tank, just below the tank top, preferably takes the form of four openings 70A, 70B, 70C, 70D (three shown in FIG. 1) that are formed in pipe 48 when it is produced. In this regard, a steel frame defining the four openings can be incorporated in the form in which culvert-like pipe 48 is formed. Each opening 70A–D is covered by a screen 50 that screens out ice particles. The screens may be conveniently hinged and latched in place for ease in installation and removal. After the supply water is drawn through the screens, the supply water descends to the base of pipe 48 where it is pumped to circumferential supply cavity 62 under the action of one of pumps 78 or 80 via the six up-pipes 74A–F. The up-pipes are fitted to a stepped-out portion 54 formed at the bottom of pipe 48 at uniform 60° spacings therearound (FIG. 2). Each up-pipe has a horizontal portion 56 that extends from pipe 48 to the inclined tank wall where a 45° elbow 57 turns the up-pipe upwardly toward circumferential supply cavity 62 with the up-pipe resting on the tank wall. A second 45° elbow 58 directs each up-pipe to a receiving opening (FIG. 3) in the inner wall of cavity 62. It will be appreciated that a barrier 68 directs the supply water to the up-pipes and prevents the water from reentering the tank at the bottom of pipe 48.

Figure 3:
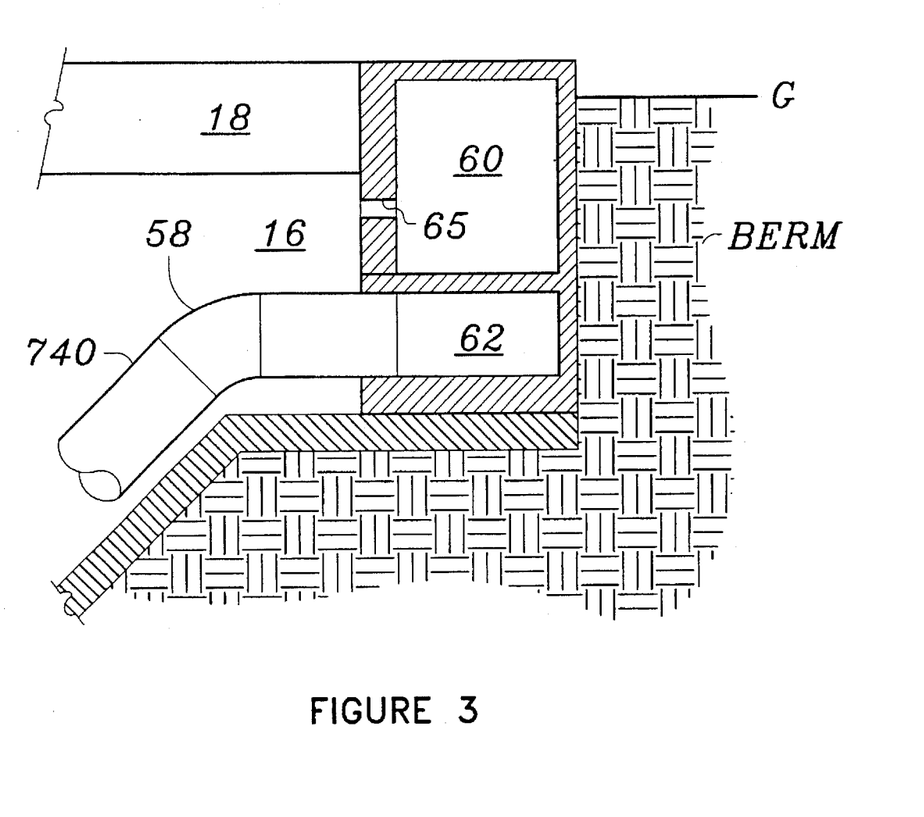
FIG. 3 is an enlarged view of the circumferential water supply and return cavities and related structure contained within the box III in FIG. 1.

With further reference to FIGS. 1–3, the water return loop serves to deliver water from the thermal load at an elevated temperature to tank 12 external of the ice mass. In the illustrated embodiment, return water from the load is conveyed via conduit 70 (FIG. 2) to the circumferential return cavity 60 from which the water is dispersed uniformly and symmetrically to tank 12. As shown in FIGS. 1 and 3, the lower portion of circumferential return cavity 60 is at an elevation below top 18, even when the top is riding at its lowest level, i.e. at 0% ice charge. A plurality of evenly spaced openings 65 are found in the lower part of cavity 60, on the inner periphery thereof, to evenly distribute the return water to the tank. In one embodiment where tank 12 has a 90-foot diameter, 141 openings are formed in cavity, 50 for return water discharge into the tank, with the openings being uniformly spaced apart by approximately two feet.

In one particular application of the invention, tank 12 has a 90-foot diameter and holds 700,000 gallons. The ice plant is a 700 tons per day unit. Pump 78 supplies cold water on demand to the load at 30,000 GPM. During ice mass building hours, pump 80 returns transport and sluice water to the ice machine at 700 GPM.

A first principle of operation of the above-described system is that the water returned from the load must flow through the ice mass in order to reach the screens and associated openings 74A–D at suction port 24. Thus, regardless of the temperature, density or pressure profiles of the tank water and regardless of any water currents in the tank, there must be a suction port arrangement that prevents the return water from simply bypassing the ice mass altogether and going back to the load without being recooled. In this regard, it will be appreciated that the water flowing through the ice mass to the suction port will tend to follow the flow path(s) of least resistance, and at times a "short circuit" or "rat hole" in the ice mass may begin to appear. However, the buoyant force of the ice mass underlying any short circuit path tends to cause the path to collapse upon itself as it begins to open, thereby requiring water to flow through relatively circuitous, high resistance (and high thermal energy transfer) paths in order to reach the suction port. Likewise, if the higher temperature return water attempts to form a short circuit path at the ice mass/top structure interface, the buoyant force of the underlying ice will cause the short circuit path to be closed as the ice collapses upon itself. Thus, the present invention provides a largely self-correcting mechanism for assuring that the water flow to the suction port generally must go through a relative circuitous, high resistance, high energy transfer path.

While the above-described elimination of short circuit paths assures that water returned from the load does not simply bypass the ice mass and wind up being returned without substantial cooling, it does not explain how the above-described system assures that the relatively colder water in the tank is consistently drawn into the suction port for supply to the load. This explanation requires examination of the relationship between density and temperature for the water in the tank. The most dense water in the tank is at approximately 39.4° F. (specific gravity 1,000). This water generally resides at the bottom of the tank. Thus, in many applications bottom suction for the supply water would produce an unacceptably warm supply water. The least dense water is at approximately 32° F. and resides near the top of the tank within the ice mass. Thus, the suction should be near the top of the tank within the ice mass to provide the relatively colder water to the load.

Lastly, but importantly, the water flow paths through the ice mass created by the water supply and water return loops must not create an uneven melt of the ice mass during repetitive ice mass melting and rebuilding in an operational cycle. Thus, once a system is developed that eliminates short circuit paths and assures withdrawal of the relatively colder water, it must also be tailored to provide uniform, symmetrical flows of water through the ice mass and symmetrical melting of the ice mass. In the illustrated embodiment, this is achieved by maintaining tank vertical centerline symmetry with respect to water flow paths. Thus, the structure and operating procedure described above serve to (i) eliminate short circuit paths while also (ii) supplying the relatively colder water in the tank back to the load while also (iii) assuring the maintenance of symmetry of the ice mass.

It will be appreciated that the principles of the present invention as applied to thermal storage tank system 10 of FIGS. 1–3 may also be applied to thermal storage tank systems having a tank and/or ice mass with different shape(s). In those cases where both the tank and ice mass are symmetrical about a single, central vertical centerline—as tank 12 and ice mass 14 are symmetrical about pipes 46,48—withdrawal of the cold water for the load may be best achieved by withdrawal within the ice mass at a single location in the tank along the vertical centerline. A system with an alternative tank shape and water return loop will be described below in connection with FIG. 4. In other embodiments of the invention, as exemplified by the system of FIGS. 5–6, the ice mass does not have 360° symmetry about a single vertical centerline so that withdrawal of cold water may be best accomplished by withdrawal at multiple locations within the ice mass in order to maintain overall ice mass symmetry.

Figure 4:
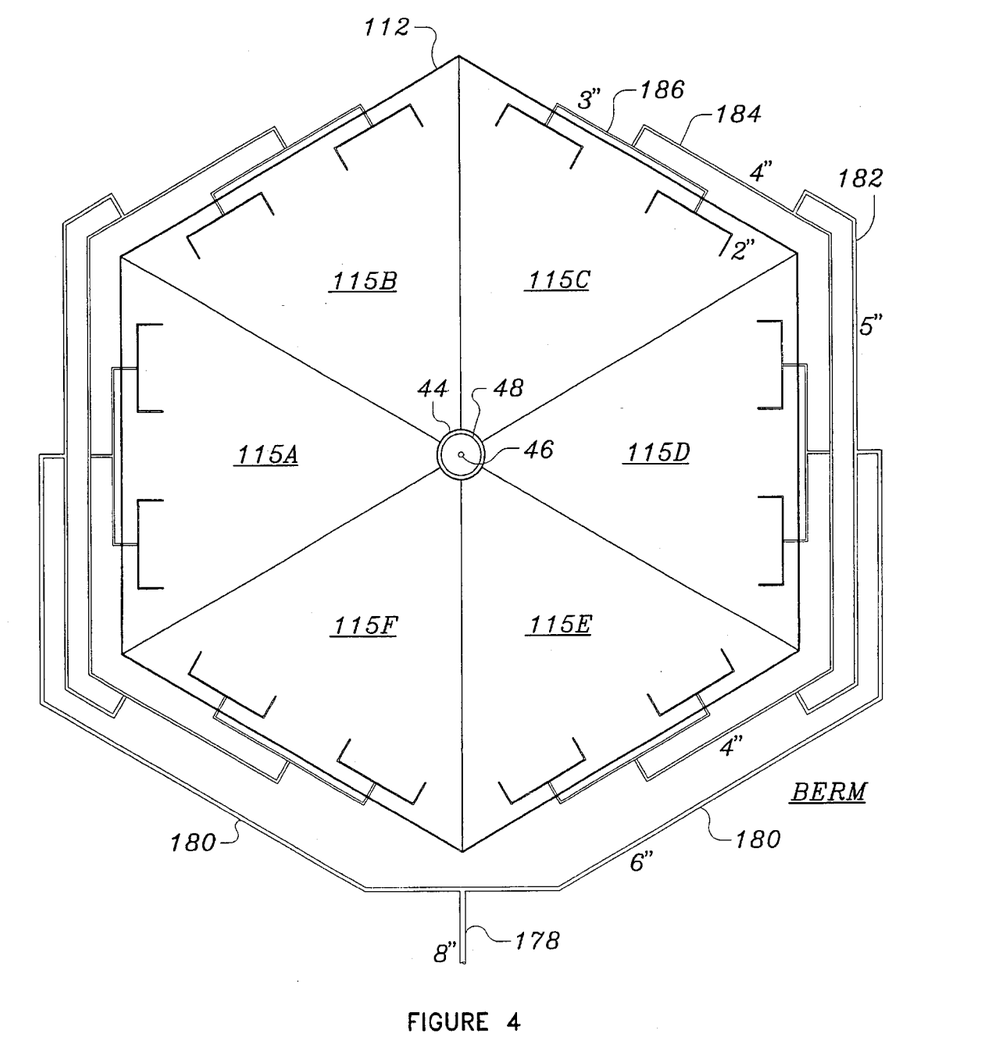
FIG. 4 is a top view of the thermal energy storage tank of a first alternative embodiment that includes a manifold for uniformly and symmetrically injecting the return water at the upper perimeter of the tank. The top structure and ice introduction hopper are not shown to facilitate illustration.

FIG. 4 is a plan view of a first alternative embodiment of the invention which includes an earth-excavated thermal energy storage tank 112 that has a hexagonal shaped top configuration. Each of the six sides 115A–F of the tank slope downwardly and inwardly at approximately 45° to provide a tank of similar shape to that illustrated in FIG. 1. All other features of tank 112, including the water suction/water supply loop, are similar to those of system 10 with the exception of the water return loop. The water return for tank 112 is achieved by a piping system that is in the berm surrounding the tank. The return water from the load returns via an eight-inch conduit 178 that splits into a pair of six-inch conduits 180. Each conduit 180 branches into a pair of five-inch conduits 182 which, in turn, feed four (4) four-inch conduits 184, eight three-inch conduits 186 and, ultimately, 16 two-inch conduits 188 that terminate in sixteen water-return nozzles within tank 112. The nozzles are evenly spaced apart around the top perimeter of the tank, and have equal length and equal turns and fittings. Thus, the embodiment of FIG. 4 achieves uniform, symmetrical distribution of the return water with piping contained within the berm surrounding the upper portion of the tank, as opposed to the circumferential return cavity mechanism associated with tank 12.

Figure 5:
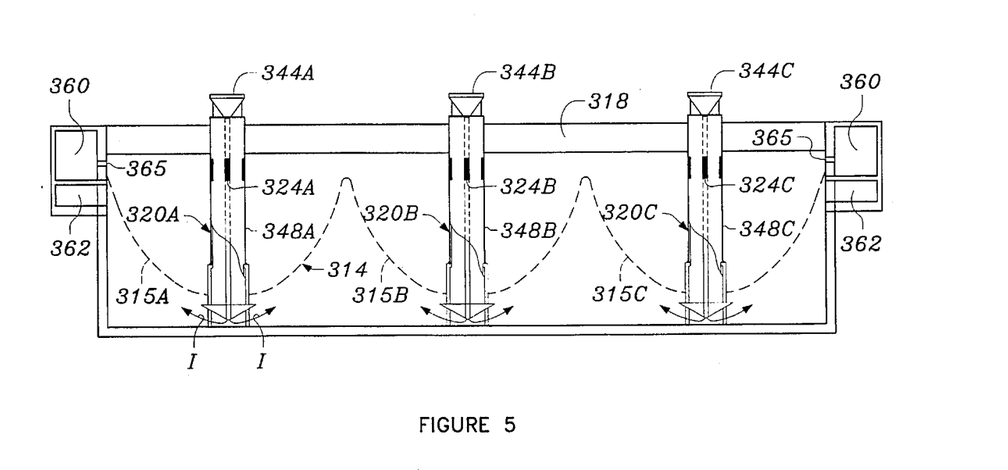
FIG. 5 is a side view, partly in section, of the thermal energy storage tank of a second alternative embodiment wherein the tank has a relatively shallow, wide rectangular shape.
Figure 6:
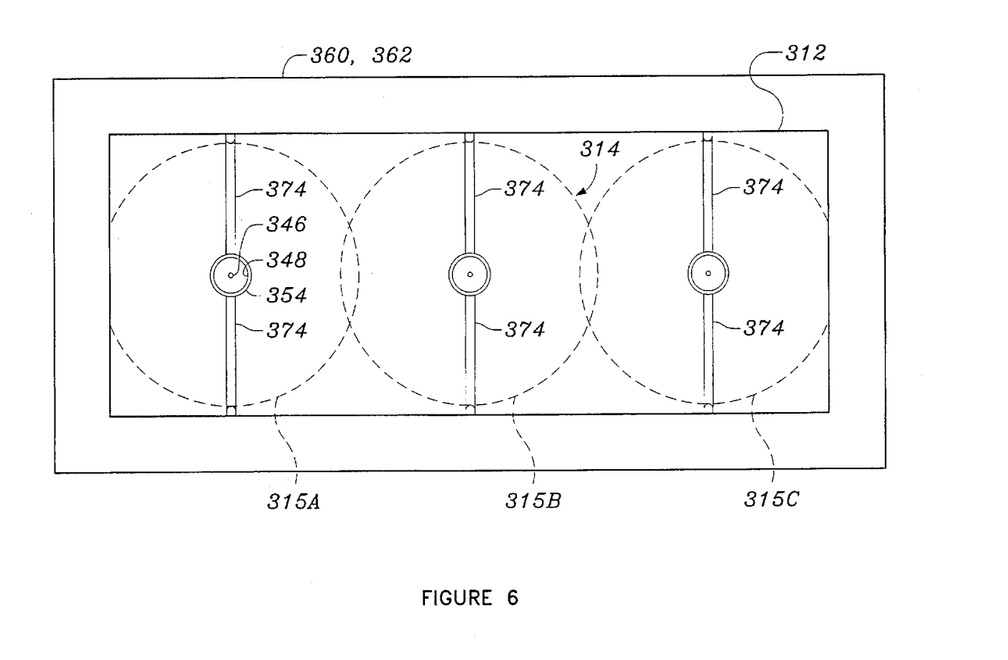
FIG. 6 is a top view of the tank of FIG. 5 with the top structure and ice introduction hoppers removed to facilitate illustration.

FIGS. 5 and 6 illustrate a second alternative embodiment including a relatively wide, shallow rectangular (as viewed in plan) tank 312. Tank 312 includes three vortex downpipe systems 320A, 320B, 320C for forming an agglomerated ice mass 314 comprising three intersecting inverted conical subparts, 315A, 315B, 315C, with each subpart emanating from one of the downpipe systems. The symmetrical melt of ice mass 314 is achieved by utilizing supply water suction ports 324A, 324B, 324C located near the top of the outer pipes 348A, 348B, 348C that encase each of the three downpipe systems. Up-pipes 374 carry the supply water from the base of the three downpipe assemblies to a perimetric water supply cavity 362 in a fashion essentially the same as that employed by the embodiment of FIGS. 1–3, with the exception that the uppipes 374 are routed to conform to the different contours of the inner walls of tank 312. The water return cavity 360 and associated openings 365 operate the same as those of the earlier described embodiments. According to the embodiment of FIGS. 5 and 6, the symmetry of ice mass 314 is maintained by withdrawing the cold water for cooling the load at multiple locations within the ice mass. The symmetry of the overall ice mass 314 is maintained by maintaining the symmetry of each of the multiple subparts of the ice mass. In this regard, each downpipe system 320A, 320B, 320C represents the vertical centerline about which symmetry is maintained for its respective ice mass subpart 315A, 315B, 315C.

As used herein, the term "thermal energy storage tank" refers primarily to a manmade envelope having a wall structure suitable for containing an ice mass and water therein. In a more general sense, the term is also used to refer to any boundary structure for containing and ice mass for the purposes described herein. For example, a natural or manmade lake may serve as a thermal energy storage tank. Such a lake may contain a single ice mass built above a single ice discharge point, a single ice mass built above multiple ice discharge points, or a plurality of distinct ice masses. In each of these cases, the ice mass may be encircled by a skirt or other suitable structure containing the ice mass within a desired area of the lake.

While the invention has been described in connection with certain illustrated embodiments, it will be appreciated that modifications may be made without departing from the true spirit and scope of the invention.

That which is claimed is:

1. In the operation of a thermal energy storage tank system of the type wherein produced ice particles are delivered to a water-flooded tank so that thermal energy is stored as an ice mass submerged in water in the tank and wherein the ice fraction in the tank undergoes cyclical changes as a result of use of the cold water in the tank to satisfy a cooling load, a method for withdrawing colder water from the storage tank for use at a cooling load and assuring that water returned from the load to the tank is recooled by the ice mass in a thermodynamically efficient manner, said method comprising the steps of withdrawing relatively colder water from the storage tank at least one location in the tank physically located within the ice mass, delivering the relatively colder water to the load and returning water from the load to the tank external of the ice mass for recooling by the ice mass.

2. The method of claim 1 including the step of withdrawing the relatively colder water from the tank and introducing water back into the tank for recooling at locations that are symmetrically disposed with respect to the ice mass to produce a symmetrical melt of the ice mass during repetitive ice mass melting and rebuilding.

3. The method of claim 1 including the steins of exerting a counterbuoyant force on the ice mass by a top structure that maintains the ice mass in a submerged state and withdrawing the relatively colder water from the tank just below the top structure.

4. The method of claim 1 including the steps of forming the ice mass in the shape of an inverted cone and withdrawing the relatively colder water at a central, upper location within the inverted conical ice mass.

5. The method of claim 4 including the step of returning the water to the tank for recooling with the returned water evenly distributed around the inverted conical ice mass.

6. The method of claim 5 including the step of returning the water for recooling uniformly around the perimeter in the tank near the water level of the tank.

7. A method of thermal energy production, storage and reclaim utilized to satisfy a cyclical thermal cooling load that is uncoupled from the power supply that produces the thermal energy, said method comprising:

producing ice particles utilizing energy from a power supply;

delivering produced ice particles to a flooded thermal energy storage tank and building a floating ice mass in the tank, said ice mass being symmetrical about at least one vertical centerline;

exerting a counterbuoyant force to the ice mass to maintain the ice mass submerged to a greater extent than if the ice mass were free floating;

withdrawing relatively colder water from the tank at selected times that define an operational cycle for cooling a thermal load and delivering the water to the load, while maintaining the symmetry of the ice mass during repetitive ice mass melting and rebuilding associated with the operational cycle;

the steps of withdrawing the relatively colder water from the tank while maintaining symmetry of the ice mass being accomplished by (i) withdrawing relatively colder water from within the ice mass at a location along the upper portion of a vertical centerline of the ice mass and (ii) returning water from the thermal load for recooling at locations symmetrically disposed within the tank external of the ice mass.

8. The method of claim 7 including the step of building the ice mass by discharging ice particles at the bottom of the tank to create an ice mass that is symmetrical about a single vertical centerline and withdrawing colder water from the tank during the operational cycle at an upper location within the ice mass substantially along the vertical centerline.

9. The method of claim 7 including the steps of building the ice mass by delivering ice particles to the bottom of the tank at a single ice discharge point to create an ice mass consisting of a single inverted conical agglomeration of ice particles, and withdrawing relatively colder water from the tank during the operational cycle at an upper location within the ice mass substantially directly above the ice discharge point.

10. The method of claim 7 including the steps of building the ice mass by delivering ice particles to the bottom of the tank at multiple ice discharge points to create an agglomerated ice mass consisting of intersecting inverted conical agglomerations of ice particles, and withdrawing relatively colder water from the tank during the operational cycle at upper locations within the ice mass substantially directly above each ice discharge point.

11. A thermal energy production, storage and reclaim system utilized to satisfy a cyclical thermal cooling load that is uncoupled from the power supply that produces the thermal energy, said system comprising:

a thermal energy storage tank;

means for maintaining said tank in a flooded state;

means for producing ice particles;

means for introducing ice particles into said tank and forming a floating ice mass therein;

a top for exerting a counterbuoyant force on the ice mass and maintaining the ice mass in a submerged state;

suction port means located relatively closely under said top and within the ice mass for withdrawing relatively colder water from said tank for use at a thermal load;

means for delivering the relatively colder water to a thermal load; and means for returning water from the thermal load to the tank external of the ice mass.

12. The system of claim 11 wherein said means for returning water from the load to the tank includes means for returning the water at locations that are symmetrically disposed with respect to the ice mass.

13. The system of claim 11 wherein said means for returning water from the load to tank includes means for returning the water uniformly around the perimeter of the tank near the water level in the tank.

14. A thermal energy storage tank system for storing and delivering thermal energy utilized to satisfy a cyclical thermal cooling load that is uncoupled from the power supply that produces the thermal energy, said storage tank system comprising:

an earth-excavated storage tank having an inwardly sloping sidewall structure inclined at an angle in the range of about 30° to 70°, said tank being symmetrical about a vertical centerline thereof;

means for maintaining a flooded state in said tank;

a columnar structure located at the vertical centerline of said tank and extending substantially from the bottom to the top of the tank, said columnar structure including an ice injection port for injecting ice into the tank at a lower central location therein for building an agglomerated ice mass having a shape approximating that of an inverted cone with a negative angle of repose in the range of about 30° to 70°, said columnar structure further including a suction port arrangement near the top thereof for withdrawing relatively colder water from said tank, said suction port arrangement being in fluid communication with a cyclical thermal cooling load through a water supply loop; and a water return loop for returning water from the thermal load to the tank for recooling, said water return loop including water delivery openings located external of and symmetrically disposed about the ice mass.

15. The system of claim 14 wherein said tank has a shape selected from the group consisting of inverted truncated cone, inverted truncated frustrum and inverted truncated obelisk.

16. The system of claim 14 wherein said water supply loop includes a perimetric cavity around the top of the tank for receiving the relatively colder water from the suction port arrangement and delivering the same to the thermal load and said water return loop includes a perimetric cavity around the top of the tank for receiving the return water from the load and distributing the same to said water delivery openings.

17. The system of claim 16 wherein said water return loop perimetric cavity includes an inner wall open to the inside of the tank and said delivery openings are formed in said inner wall.

18. The system of claim 16 wherein said water supply loop includes a plurality of up-pipes for carrying the relatively colder water from said columnar structure to said water supply loop perimetric cavity.

19. In a method of thermal energy production, storage, and reclaim that includes the steps of:

producing ice particles;

delivering produced ice particles to a water-flooded thermal energy storage tank and building a floating ice mass in the tank;

exerting a counterbuoyant force to the ice mass to maintain the ice mass submerged to a greater extent than if the ice mass were free floating;

withdrawing water from the tank at selected times for cooling a thermal load and returning water at elevated temperature to tank;

wherein the steps of producing and delivering ice and withdrawing water and returning water at elevated temperature creates a cyclical buildup and melting down of the ice mass, resulting in a cyclically changing ice fraction in the tank;

the IMPROVEMENT comprising (i) performing the step of withdrawing water from the tank by withdrawing the water from the storage tank at least one location physically located within the ice mass and (ii) performing the step of returning water at elevated temperature by returning the water external of the ice mass.

20. The method of claim 19 wherein the water is withdrawn from at least one location physically located within the upper portion of the ice mass proximate the center of the ice mass as viewed from above.

* * * * *